(12) United States Patent
Topp et al.

(10) Patent No.: US 9,284,904 B2
(45) Date of Patent: Mar. 15, 2016

(54) METHOD AND DEVICE FOR MONITORING A HIGH-PRESSURE FUEL SYSTEM

(75) Inventors: Stephan Topp, Leonberg (DE); Rainer Peck, Ludwigsburg (DE); Rene Zieher, Edingen-Neckarhausen (DE); Christian Kriechbaum, Dossenheim (DE); Steffen Meyer-Salfeld, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 242 days.

(21) Appl. No.: 13/506,000

(22) PCT Filed: Oct. 12, 2010

(86) PCT No.: PCT/EP2010/065275
§ 371 (c)(1),
(2), (4) Date: Jul. 19, 2012

(87) PCT Pub. No.: WO2011/054633
PCT Pub. Date: May 12, 2011

(65) Prior Publication Data
US 2012/0283934 A1    Nov. 8, 2012

(30) Foreign Application Priority Data

Nov. 5, 2009  (DE) .................. 10 2009 046 419

(51) Int. Cl.
*F02D 41/22*   (2006.01)
*F02D 41/40*   (2006.01)

(52) U.S. Cl.
CPC .............. *F02D 41/222* (2013.01); *F02D 41/22* (2013.01); *F02D 41/402* (2013.01);
(Continued)

(58) Field of Classification Search
CPC ................... F02D 2041/224; F02D 2041/223; F02D 41/222; F02D 2041/402; F02D 2041/403; F02D 2250/04; F02D 2200/0614; F02D 2200/0616; F02M 65/001
USPC ............. 123/299, 198 D; 73/114.43; 701/114
See application file for complete search history.

(56) References Cited

U.S. PATENT DOCUMENTS 5,499,538 A * 3/1996 Glidewell et al. .......... 73/114.41
6,234,148 B1 * 5/2001 Hartke et al. ................. 123/447
(Continued)

FOREIGN PATENT DOCUMENTS

CN    101089378    12/2007
CN    101353991    1/2009
(Continued)

*Primary Examiner* — Lindsay Low
*Assistant Examiner* — Robert Werner
(74) *Attorney, Agent, or Firm* — Kenyon & Kenyon LLP

(57) ABSTRACT

A method for monitoring a fuel pressure in a fuel injection system of an internal combustion engine. A setpoint fuel pressure is initially set in the fuel injection system. Next, a first fuel injection and a subsequent second fuel injection are executed at a time interval shorter than a decay time of a pressure wave in the fuel injection system, triggerable by the first fuel injection. In an additional step, a monitored fuel injection quantity, which is injected via the second fuel injection, is ascertained. An action is executed if the monitored fuel injection quantity differs from a setpoint fuel injection quantity, which is predefinable for the setpoint fuel pressure, by more than a limiting value. The invention also relates to a computer program product for executing the method and to a device for monitoring a fuel pressure in a fuel injection system of an internal combustion engine.

12 Claims, 3 Drawing Sheets

(52) U.S. Cl.
CPC .... *F02D 2041/223* (2013.01); *F02D 2041/224* (2013.01); *F02D 2041/228* (2013.01); *F02D 2250/04* (2013.01); *Y02T 10/44* (2013.01)

(56) References Cited

U.S. PATENT DOCUMENTS

| | | | |
|---|---|---|---|
| 6,557,530 B1 * | 5/2003 | Benson et al. | 123/480 |
| 7,143,747 B2 * | 12/2006 | Uchiyama | 123/456 |
| 7,210,458 B2 * | 5/2007 | Walther et al. | 123/446 |
| 7,255,087 B2 * | 8/2007 | Kanne et al. | 123/299 |
| 7,900,605 B2 * | 3/2011 | Dingle | 123/480 |
| 8,191,412 B2 * | 6/2012 | Doring | 73/114.71 |
| 2009/0164102 A1 | 6/2009 | Olbrich et al. | |

FOREIGN PATENT DOCUMENTS

| | | |
|---|---|---|
| DE | 10 2006 013493 | 10/2007 |
| DE | 10 2008 044050 | 6/2009 |
| GB | 2 402 233 | 12/2004 |
| JP | 2003-41997 | 2/2003 |

* cited by examiner

METHOD AND DEVICE FOR MONITORING A HIGH-PRESSURE FUEL SYSTEM

FIELD OF THE INVENTION

The present invention relates to a method for monitoring a fuel pressure in a fuel injection system of an internal combustion engine. Furthermore, the present invention relates to a computer program product for executing such a method and a device for monitoring a fuel pressure in a fuel injection system of an internal combustion engine.

BACKGROUND INFORMATION

Common rail fuel systems in which fuel is delivered by a delivery device into a fuel pressure storage device, the so-called rail, are believed to be available from the market. Multiple fuel injectors, which inject fuel directly into the assigned combustion chambers, are connected to the fuel pressure storage device. The pressure in the fuel pressure storage device is detected by a pressure sensor and regulated by a setting device to a variable setpoint pressure. The fuel injection quantity injected into a combustion chamber of the internal combustion engine depends, on the one hand, on the actual pressure in the fuel pressure storage device and, on the other hand, on the triggering time and the associated injection duration of the fuel injectors.

The signal supplied by the pressure sensor may be faulty due to damage, targeted manipulation, e.g., in the context of engine tuning or because of a pronounced drift, which results in the actual pressure prevailing in the fuel pressure storage device deviating more than intended from the setpoint pressure. The service life of components of the fuel system may be reduced in this way, the mixture-forming quality may decline and there may be deviations in the actual injection quantity from a setpoint injection quantity. It is therefore desirable to constantly monitor the signal of the pressure sensor for plausibility during operation of the internal combustion engine, e.g., as is increasingly being required by legislation in the case of diesel engines. However, installation of two or more redundant pressure sensors whose signals are compared with one another is associated with high costs.

German patent document DE 10 2008 044050 A1 discusses a method for operating an internal combustion engine in which a test injection quantity is initially established. The internal combustion engine is then operated at a first setpoint pressure and a first triggering time corresponding to this setpoint pressure and the test fuel injection quantity to be injected. A variable, which characterizes the operating state and is influenced by the actually injected fuel quantity, is detected in this process. The internal combustion engine is subsequently operated at a second setpoint pressure and a second triggering time corresponding to this setpoint pressure and to the test fuel injection quantity, and the variable characterizing the operating state is detected again. An action is executed when the two detected variables differ by more than a limiting value. Since there is a general nonlinear relationship between the fuel pressure and the injected fuel injection quantity at a given triggering time, it may be determined in this way whether the actual fuel pressure deviates inadmissibly from the setpoint pressure, e.g., due to a pressure sensor defect.

However, use of the method described here during ongoing operation of the internal combustion engine would require the fuel pressure to be set at least intermittently to setpoint values which are suboptimal for operation, which would have a negative influence on the service life of fuel system components, on the mixture-forming quality, on the fuel consumption and emissions.

SUMMARY OF THE INVENTION

Accordingly, a method for monitoring a fuel pressure in a fuel injection system of an internal combustion engine is provided. A predefinable setpoint fuel pressure in the fuel injection system is initially set. Next, a first and an ensuing second fuel injection are executed at a time interval which is shorter than a decay time of a pressure wave in the fuel injection system triggerable by the first fuel injection. In another step, a monitored fuel injection quantity injected via the second fuel injection is ascertained. This may involve the fuel injection quantity injected only via the second fuel injection as well as the total fuel injection quantity injected via the first and second fuel injections. An action is executed if the monitored fuel injection quantity differs from a setpoint fuel injection quantity, which is predefinable for the setpoint fuel pressure, by more than a limiting value. This action may include, for example, an entry in an error memory, but it may also be, for example, a flashing warning lamp or an emergency shutdown of the internal combustion engine.

In modern fuel injection systems, e.g., common rail systems, executing a fuel injection typically involves a sharp drop in the fuel pressure in a feeder line from a fuel pressure storage device to an injection device (injector) situated in the fuel injection system. This short-term pressure drop produces a fuel pressure wave, which occurs, for example, between the fuel pressure storage device and the injector after the end of the triggering and which subsides within a characteristic decay time. Since in the present method, the second fuel injection is executed even before the pressure wave triggered by the first fuel injection has subsided, the fuel pressure prevailing at the fuel injector during the second fuel injection is altered in comparison with an actual fuel pressure prevailing statically in the fuel injection system, which influences the second fuel injection quantity injected during the second fuel injection.

The influence of the pressure wave is basically predictable, under the assumption that the actual fuel pressure is equal to the setpoint fuel pressure, e.g., when the pressure setting device and a pressure sensor are functioning properly. For example, different values for the setpoint injection quantity, which apply to different values of the setpoint pressure that could be set during operation, may be measured on a test bank and saved in a corresponding engine characteristics map. If the actual fuel pressure deviates from the setpoint fuel pressure during operation of the internal combustion engine, then the characteristic of the pressure wave triggered by the first fuel injection and thus the second injected fuel quantity undergo a change, so that if there is a defect in a pressure sensor which is the cause of the deviation, for example, the action is executed and countermeasures are enabled.

The fact that the predefinable setpoint fuel pressure need no longer be altered after having been set also advantageously permits the setpoint fuel pressure to be left at a constant value during the course of the process, in particular being left at an optimal value for the respective operating state. The use of this method is therefore not limited to certain operating states, for example, starting up the internal combustion engine, but instead is also suitable for use in continuous operation of the internal combustion engine without having a negative influence on the service life of components of the fuel system, on the mixture-forming quality, on the fuel consumption or emissions.

The exemplary embodiments and/or exemplary methods of the present invention also provides a computer program product for executing the method and a device for monitoring a fuel pressure in a fuel injection system of an internal combustion engine, among other aspects.

According to one refinement of the method, a total fuel injection quantity injected via the first and second fuel injections on the whole is ascertained as the monitored fuel injection quantity.

According to one refinement, a calibration fuel injection is also executed, this calibration fuel injection occurring earlier than the first fuel injection by a calibration time interval. The calibration time interval is longer than the decay time of a pressure wave triggerable by the calibration fuel injection in the fuel injection system. This means that the first fuel injection and thus also the second fuel injection which occurs later are not influenced by the pressure wave of the calibration fuel injection. In additional steps, a calibration fuel injection quantity injected via the calibration fuel injection is ascertained, and a triggering time for the first and/or the second fuel injection is determined, based on the calibration fuel injection quantity and the setpoint fuel injection quantity. The injection quantity of the first fuel injection and thus its effect on the second fuel injection quantity may be monitored in a particularly precise manner in this way, enabling the detection of already minor deviations between the actual fuel pressure and the setpoint fuel pressure.

The calibration fuel injection and ascertainment of the calibration fuel injection quantity may be executed repeatedly, with a step of ascertaining a triggering time for the corresponding following calibration fuel injection also being provided, this step taking place on the basis of the calibration fuel injection quantity and the setpoint fuel injection quantity. This enables the calibration to be executed even more precisely, e.g., also iteratively with a termination criterion and thus makes it possible to achieve even more sensitive detection of a pressure deviation.

According to one refinement, the first and the second fuel injections are executed repeatedly, whereby the monitoring time interval is varied. This further increases the sensitivity of the method since multiple measured values are combined.

According to one refinement, the first and/or the second fuel injection is/are a preinjection or a postinjection, which may or may not contribute to the rotational speed of the internal combustion engine. Smooth running of the internal combustion engine is maintained in this way, even if there are deviations between the actual fuel pressure and the setpoint fuel pressure, which influence the second fuel injection quantity.

According to one refinement, the monitored fuel injection quantity is ascertained on the basis of a lambda sensor signal. According to one refinement, the monitored fuel injection quantity is ascertained on the basis of a signal of a tachometer or a torque meter. The term "fuel injection quantity" is basically understood to refer to any variable which characterizes the respective fuel injection quantity, even if it does not directly specify a volume or a mass.

The exemplary embodiments and/or exemplary methods of the present invention are explained below on the basis of specific embodiments and accompanying figures.

DETAILED DESCRIPTION

Figure 1:
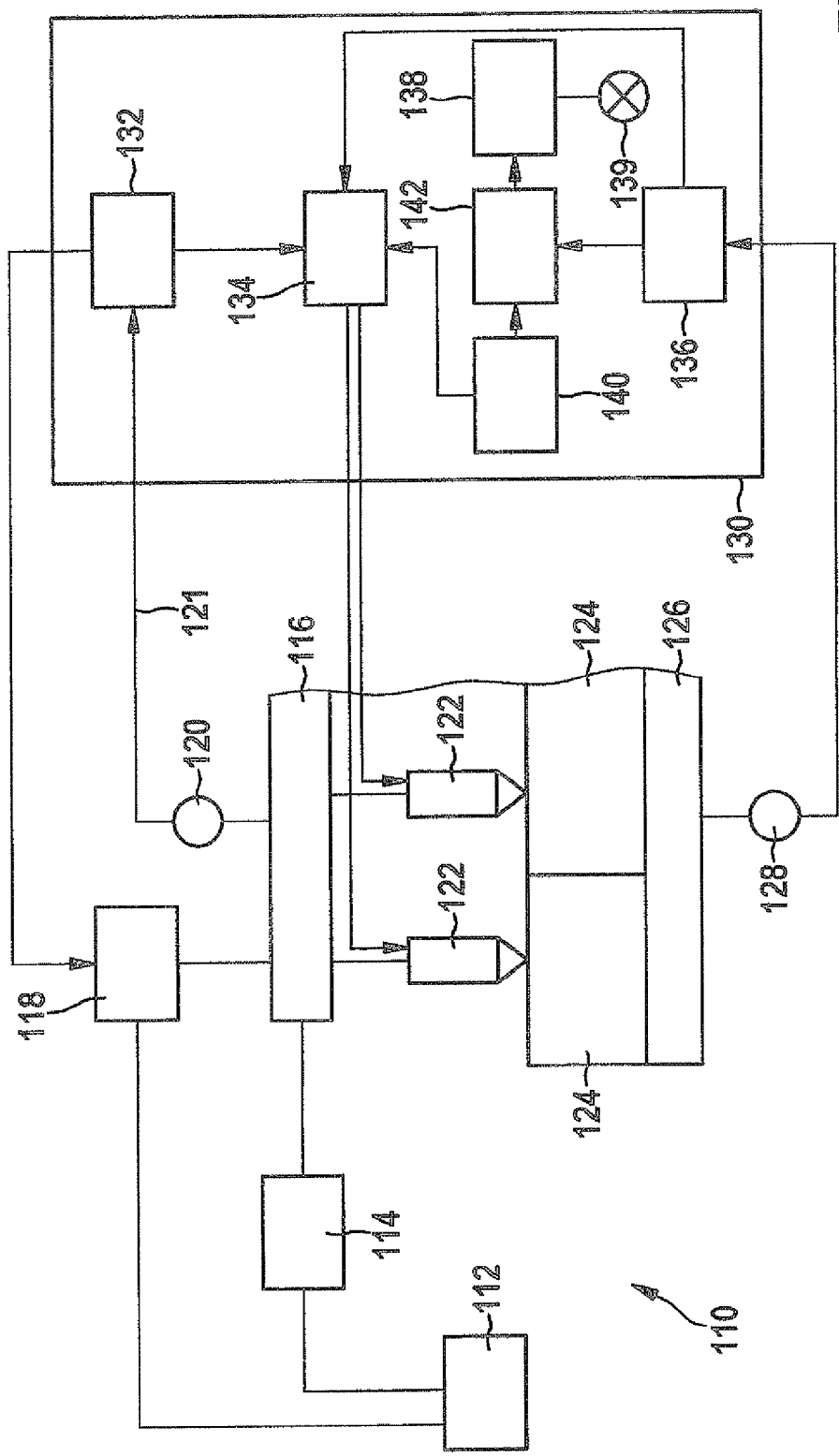
FIG. 1 shows a schematic block diagram of a device for monitoring a fuel pressure in a fuel injection system of an internal combustion engine according to one specific embodiment of the present invention.

In the figures, the same reference numerals are used to denote the same components or those having the same function, as long as nothing to the contrary is indicated.

A fuel system of an internal combustion engine in FIG. 1 is labeled with reference numeral 110 on the whole. It includes a fuel tank 112, from which a delivery device 114, for example, including a predelivery pump and a high-pressure pump, delivers fuel to a fuel pressure storage device 116. A pressure regulating valve 118 and a pressure sensor 120 are connected to this fuel pressure storage device and multiple injection devices (injectors) 122, which inject fuel directly into combustion chambers 124 of the internal combustion engine (not otherwise shown) assigned to them. Combustion of the injected fuel in combustion chambers 124 causes crankshaft 126 to rotate. A crankshaft sensor 128 detects the revolutions and the rotational speed of crankshaft 126.

Operation of the internal combustion engine and fuel system 110 is controlled or regulated by a control unit 130. For this purpose, control unit 130 receives signals from pressure sensor 120 and from crankshaft sensor 128, among other things. Control unit 130 triggers injectors 122 and pressure regulating valve 118, among other things. Control unit 130 includes a fuel pressure controller 132 for setting a predefinable setpoint fuel pressure in fuel pressure storage device 116 of fuel injection system 110. Fuel pressure controller 132 is connected to pressure sensor 120 for receiving a fuel pressure signal 121 and is connected to pressure regulating valve 118 for carrying out regulating interventions. The pressure in fuel pressure storage device 116 is variable during normal operation of the internal combustion engine and is set by fuel pressure controller 132 to the setpoint fuel pressure, which is predefined as a function of various operating variables, for example, an operating temperature and/or a rotational speed of the internal combustion engine.

Figure 2:
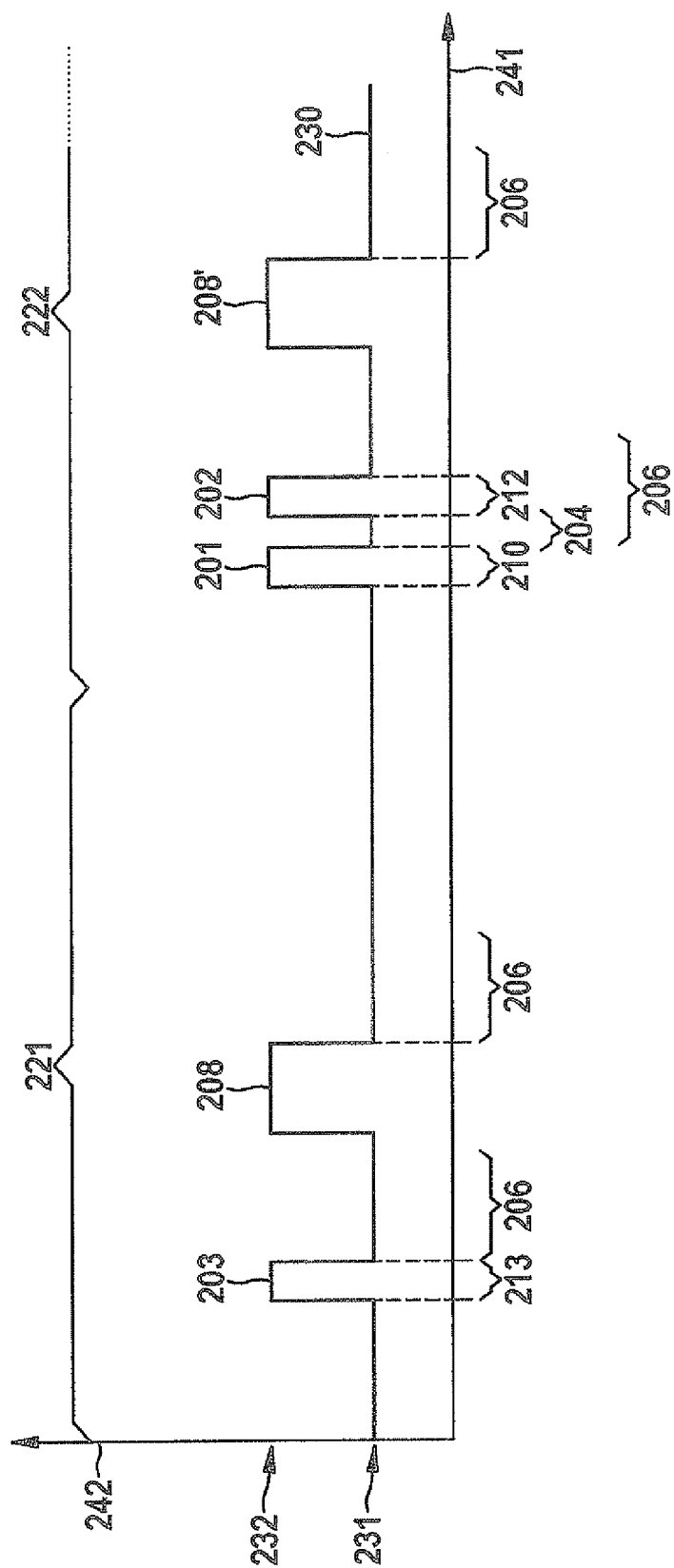
FIG. 2 shows a graph of a time characteristic of a triggering signal of a fuel injector during execution of a method for monitoring a fuel pressure in a fuel injection system of an internal combustion engine according to one specific embodiment.

An injection control unit 134 of control unit 130, which triggers injectors 122, is connected to fuel pressure controller 132 and injectors 122. In a graph along a voltage axis 242 plotted over a time axis 241, FIG. 2 shows a simplified exemplary triggering signal 241, which is sent by injection control unit 134 during operation to one of fuel injectors 122. Triggering signal 241 shown here has a square wave characteristic which varies between a first voltage value 231, e.g., 0 V, at which the respective fuel injector 122 is closed, and a second voltage value 232, at which this fuel injector 122 is opened to inject fuel into the respective combustion chamber 124. A pressure wave running between fuel pressure storage device 116 and fuel injector 122 is triggered in fuel injection system 110 through the opening and closing of fuel injector 122, and subsides again within a decay time 206. Triggering signal 230 has two main injections 208, 208' which belong to two successive cycles 221, 222 of the internal combustion engine.

In second cycle 222 of two cycles 221, 222, triggering signal 230 has a first fuel injection 201 and a subsequent second fuel injection 202, represented here as preinjections 201, 202, for example. First fuel injection 201 and second fuel injection 202 occur at a time interval 204 apart from each other, this interval being shorter than decay time 206 of the pressure wave in fuel injection system 110 triggered by first fuel injection 201.

Control unit 130 has a fuel injection quantity presetting unit 140, which is connected to injection control unit 134, and during operation it supplies a setpoint fuel injection quantity for first and second fuel injections 201, 202 combined. Injection control unit 134 determines corresponding triggering times 210, 212 of first and second fuel injections 201, 202, the setpoint fuel pressure set in fuel pressure storage device 116 and the influence on second fuel injection 202 to be expected at this pressure due to the pressure wave triggered by first fuel injection 201 being taken into account. For example, matching triggering times 210, 212 for first and second fuel injections 201, 202 are determined.

Control unit 130 has a fuel injection quantity ascertaining unit 136, which is connected to rotational speed sensor 128 and ascertains the injected fuel quantity from the influence exerted by a fuel injection on the rotational speed of the internal combustion engine. In alternative specific embodiments, fuel injection quantity ascertaining unit 136 is designed, for example, to ascertain the injected fuel quantity in each case by some other method, from a lambda sensor signal, for example. To determine triggering times 210, 212 with great precision, injection control unit 134 executes a calibration fuel injection 203 in cycle 221 of the internal combustion engine shown at the left in FIG. 2, also as a preinjection, at a triggering time 213. Injection control unit 134 is designed to calibrate triggering times 210, 212 for first and second fuel injections 201, 202 on the basis of a calibration fuel injection quantity injected via calibration fuel injection 203 and ascertained by fuel injection quantity ascertaining unit 136, in such a way that when a setpoint fuel pressure set in fuel pressure storage device 116 is assumed, first and second fuel injections 201, 202 inject exactly the setpoint fuel injection quantities on the whole.

During operation, fuel injection quantity ascertaining unit 136 ascertains the monitored fuel injection quantity actually injected in this way from the signal of rotational speed sensor 128 after executing the first and second fuel injections and relays it to a fuel injection quantity comparator 142 of the control unit, which compares the monitored fuel injection quantity with the setpoint fuel injection quantity. Fuel injection quantity comparator 142 is designed to output an error signal to error action unit 138 of the control unit when the monitored fuel injection quantity differs from the setpoint fuel injection quantity by more than a predefinable limiting value, which is stored in fuel injection quantity comparator 142, for example. Error action unit 138 switches on a warning lamp 139, warning the user of the internal combustion engine of a possible defect in pressure sensor 120.

Figure 3:
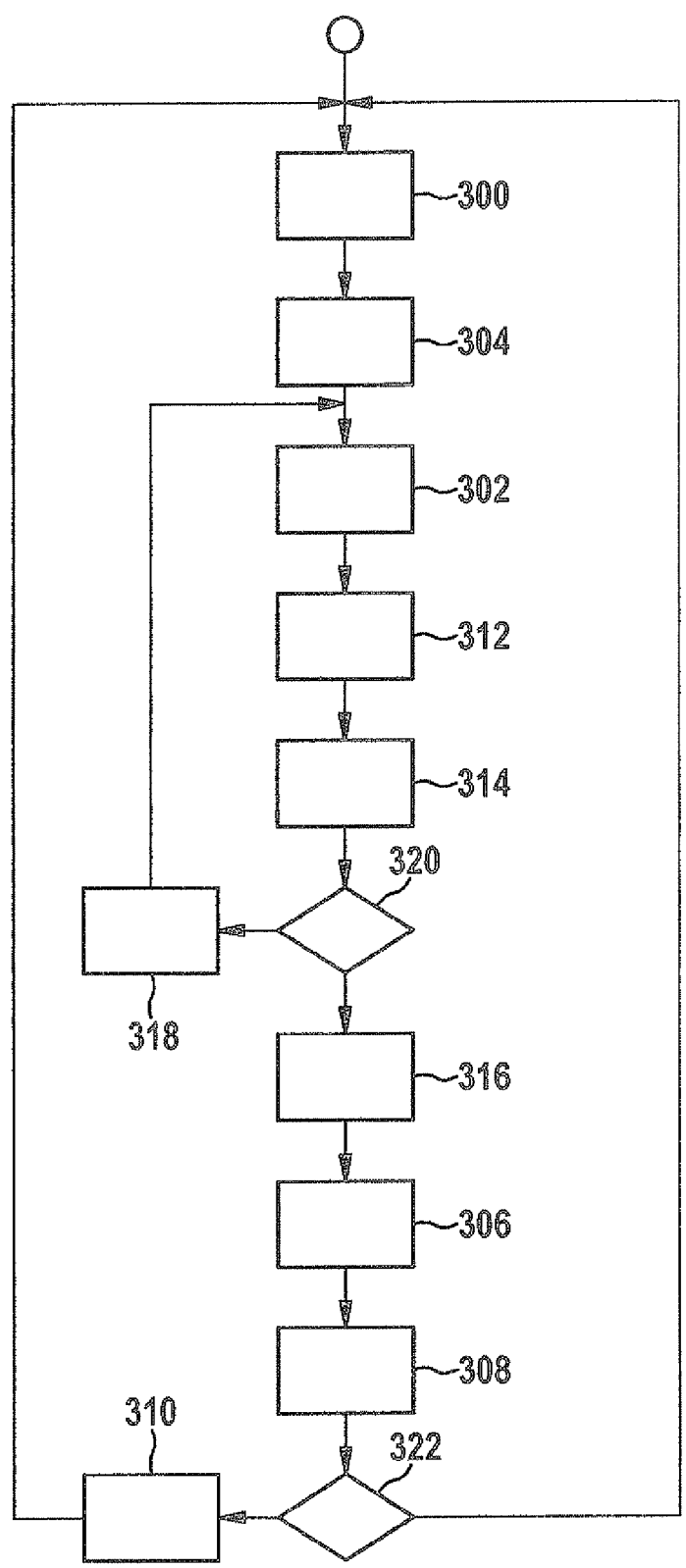
FIG. 3 shows a flow chart of a method for monitoring a fuel pressure according to one specific embodiment.

FIG. 3 shows a flow chart for an exemplary method for monitoring a fuel pressure in a fuel injection system of an internal combustion engine. In step 300, a setpoint fuel pressure is initially predefined in a fuel pressure storage device of the fuel injection system, e.g., based on an instantaneous rotational speed and an operating temperature of the internal combustion engine. In step 304, the setpoint fuel pressure predefined in step 300 is set in the fuel injection system, in that a pressure regulating valve and/or a high-pressure pump is/are regulated according to a signal of a pressure sensor mounted on the fuel pressure storage device.

In step 302, a setpoint fuel injection quantity is predefined for a calibration fuel injection. This may be a predetermined constant value, for example. In step 312, the calibration fuel injection is executed, for example, as a preinjection during a cycle of the internal combustion engine having an injection duration which is based on the setpoint fuel pressure, the setpoint fuel injection quantity and, if necessary, other parameters such as the fuel temperature. In step 314, a calibration fuel injection quantity, which is actually injected via the calibration fuel injection, is ascertained, for example, based on a lambda sensor signal. In step 320, a difference between the setpoint fuel injection quantity and the actually injected calibration fuel injection quantity is ascertained. If this difference is greater than a predefinable limiting value, for example, then the injection duration for the calibration fuel injection is corrected and redefined in step 318 accordingly, and in step 312 a calibration fuel injection is executed again, for example, in a following cycle of the internal combustion engine.

If the difference ascertained in step 320 is below the limiting value, then the method departs from the loop. In step 316, taking into account the preceding calibration, a triggering time for a first and a second fuel injection is established, these being provided successively in a predefined chronological interval, which is shorter than the decay time of a pressure wave in the fuel injection system triggerable by the first fuel injection. The triggering times are established in such a way that the first and the second fuel injections inject on the whole precisely the setpoint fuel injection quantity, assuming the setpoint fuel pressure and taking into account the effect of the pressure wave. In step 306, the first and the second fuel injections are executed at the established chronological interval, for example, also as preinjections within another cycle of the internal combustion engine in which they replace the calibration fuel injection from step 312. In step 308, the fuel injection quantity actually injected via both injections is also ascertained from the lambda sensor signal.

In step 322, a difference is ascertained between the setpoint fuel injection quantity and the fuel injection quantity actually injected by the first and second fuel injections as ascertained in step 308. If the difference is greater than another limiting value, which is predefinable as a constant, for example, and may also be equal to the limiting value used in step 320, an action is executed in step 320 which registers an error in the pressure regulation executed in step 304; this error may be based on a defective pressure sensor. The method is continued with step 300.

What is claimed is:

1. A method for monitoring a fuel pressure in a fuel injection system of an internal combustion engine, the method comprising:
   executing a first fuel injection and a subsequent second fuel injection in a monitoring time interval which is shorter than a decay time of a pressure wave in the fuel injection system triggerable by the first fuel injection;
   setting a setpoint fuel pressure in response to an operating state of the fuel injection system at which there is a first actual fuel pressure in the fuel injection system, the setpoint fuel pressure being maintained after a change in the fuel injection system to a second actual fuel pressure;
   setting a setpoint fuel injection quantity based on the setpoint fuel pressure;
   ascertaining a monitored fuel injection quantity injected via the second fuel injection; and
   outputting to a user of the internal combustion engine a warning of a defective pressure sensor when the monitored fuel injection quantity differs by more than a limiting value from the setpoint fuel injection quantity.

2. The method of claim 1, wherein the setpoint fuel injection quantity specifies a total quantity of fuel delivered by the first fuel injection and the second fuel injection combined, and wherein an actual total fuel injection quantity injected as a whole via the first fuel injection and the second fuel injection is ascertained as the monitored fuel injection quantity.

3. The method of claim 1, the method further comprising:
executing a calibration fuel injection to produce a calibration time interval before the first fuel injection which is longer than a decay time of a pressure wave in the fuel injection system triggerable by the calibration fuel injection;
ascertaining a calibration fuel injection quantity injected via the calibration fuel injection; and
establishing a triggering duration for at least one of the first fuel injection and the second fuel injection based on the calibration fuel injection quantity and the setpoint fuel injection quantity.

4. The method of claim 3, wherein the execution of the calibration fuel injection and ascertainment of the calibration fuel injection quantity are executed repeatedly, and wherein a triggering time is ascertained for the respective subsequent calibration fuel injection based on the calibration fuel injection quantity and the setpoint fuel injection quantity.

5. The method of claim 1, wherein the first fuel injection and the second fuel injection are executed repeatedly, the monitoring time interval being varied.

6. The method of claim 1, wherein at least one of the first fuel injection and the second fuel injection is one of a preinjection and a postinjection, which does not contribute toward the rotational speed of the internal combustion engine.

7. The method of claim 1, wherein the ascertainment of the monitored fuel injection quantity takes place based on a lambda sensor signal.

8. The method of claim 1, wherein the ascertainment of the monitored fuel injection quantity occurs based on a signal of a tachometer or a torque meter.

9. A computer readable medium having a computer program, which is executable by a processor, comprising:
a program code arrangement having program code for monitoring a fuel pressure in a fuel injection system of an internal combustion engine, by performing the following:
executing a first fuel injection and a subsequent second fuel injection in a monitoring time interval which is shorter than a decay time of a pressure wave in the fuel injection system triggerable by the first fuel injection;
setting a setpoint fuel pressure in response to an operating state of the fuel injection system at which there is a first actual fuel pressure in the fuel injection system, the setpoint fuel pressure being maintained after a change in the fuel injection system to a second actual fuel pressure;
setting a setpoint fuel injection quantity based on the setpoint fuel pressure;
ascertaining a monitored fuel injection quantity injected via the second fuel injection; and
outputting to a user of the internal combustion engine a warning of a defective pressure sensor when the monitored fuel injection quantity differs by more than a limiting value from the setpoint fuel injection quantity.

10. A device for monitoring a fuel pressure in a fuel injection system of an internal combustion engine, comprising:
an injection control unit for executing a first fuel injection and a second fuel injection at a time interval which is shorter than a decay time of a pressure wave in the fuel injection system triggerable by the first fuel injection;
a fuel pressure controller for setting a setpoint fuel pressure in response to an operating state of the fuel injection system at which there is a first actual fuel pressure in the fuel injection system, the setpoint fuel pressure being maintained after a change in the fuel injection system to a second actual fuel pressure;
a fuel injection quantity presetting unit for setting a setpoint fuel injection quantity based on the setpoint fuel pressure;
a fuel injection quantity ascertaining unit for ascertaining a monitored fuel injection quantity injected via the second fuel injection; and
a warning unit for outputting to a user of the internal combustion engine a warning of a defective pressure sensor when the monitored fuel injection quantity differs by more than a limiting value from the setpoint fuel injection quantity.

11. The method of claim 1, wherein the setpoint fuel pressure corresponds to a pressure at a fuel pressure storage device in the fuel injection system.

12. The method of claim 1, wherein the setpoint fuel injection quantity is a quantity that will be delivered through the first and the second fuel injections if an actual fuel pressure in the fuel injection system is equal to the setpoint fuel pressure.

* * * * *